US011933897B2

(12) United States Patent
Ide et al.

(10) Patent No.: US 11,933,897 B2
(45) Date of Patent: Mar. 19, 2024

(54) DISTANCE MEASUREMENT DEVICE

(71) Applicant: Panasonic Intellectual Property Management Co., Ltd., Osaka (JP)

(72) Inventors: Kazuhisa Ide, Aichi (JP); Masaomi Inoue, Aichi (JP); Hirotaka Ueno, Osaka (JP); Kouichi Kumamaru, Osaka (JP); Masahiro Shiihara, Aichi (JP); Kouichi Bairin, Aichi (JP); Takashi Haruguchi, Aichi (JP); Kiyoshi Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 840 days.

(21) Appl. No.: 17/061,561

(22) Filed: Oct. 1, 2020

(65) Prior Publication Data

US 2021/0018625 A1    Jan. 21, 2021

Related U.S. Application Data

(63) Continuation of application No. PCT/JP2019/013352, filed on Mar. 27, 2019.

(30) Foreign Application Priority Data

May 17, 2018  (JP) .................. 2018-095690

(51) Int. Cl.
G01S 17/10 (2020.01)
G01S 7/481 (2006.01)
G02B 26/10 (2006.01)

(52) U.S. Cl.
CPC ........... *G01S 17/10* (2013.01); *G01S 7/4812* (2013.01); *G01S 7/4814* (2013.01); *G01S 7/4817* (2013.01); *G02B 26/10* (2013.01)

(58) Field of Classification Search
CPC ....... G01S 17/10; G01S 7/4814; G01S 7/4817
See application file for complete search history.

(56) References Cited

U.S. PATENT DOCUMENTS 7,589,826 B2 *  9/2009  Mack ............... G01S 17/10
                                                   356/5.01
8,319,979 B2 * 11/2012  Hanchett .......... G01B 11/2518
                                                   356/625

(Continued)

FOREIGN PATENT DOCUMENTS

EP    2434312 B1 *  1/2013 ............. G01B 11/24
JP    2004-061143      2/2004
(Continued)

OTHER PUBLICATIONS

International Search Report issued in corresponding International Patent Application No. PCT/JP2019/013352, dated Jun. 25, 2019, with English translation.

*Primary Examiner* — Isam A Alsomiri
*Assistant Examiner* — Joseph C Fritchman
(74) *Attorney, Agent, or Firm* — Rimon P.C.

(57) ABSTRACT

A distance measurement device includes: a mirror disposed so as to be tilted relative to a rotation center axis; a drive unit configured to rotate the mirror about the rotation center axis; a photodetector configured to detect reflected light, of laser light, reflected in a distance measurement region; and a condensing lens disposed on the rotation center axis and configured to condense the reflected light reflected by the mirror, on the photodetector. The mirror has a shape elongated in one direction and is disposed such that a short axis thereof is tilted relative to the rotation center axis in a direction parallel to a plane including the rotation center axis. A width in a short-axis direction of the mirror is smaller (Continued)

than a width of a lens portion of the condensing lens as viewed in a direction parallel to the rotation center axis.

6 Claims, 6 Drawing Sheets

(56) References Cited

U.S. PATENT DOCUMENTS

| | | |
|---|---|---|
| 2008/0151218 A1 | 6/2008 | Mack et al. |
| 2012/0099117 A1 | 4/2012 | Hanchett et al. |
| 2015/0219763 A1* | 8/2015 | Nubling .................. G01S 17/42 |
| | | 250/221 |
| 2018/0348505 A1* | 12/2018 | Sekii .................... H02K 5/1675 |

FOREIGN PATENT DOCUMENTS

| | | |
|---|---|---|
| JP | 2004-067035 | 3/2004 |
| JP | 2012-068243 | 4/2012 |
| JP | 2015-148605 | 8/2015 |
| JP | 2018-105746 | 7/2018 |
| JP | 2018-205368 | 12/2018 |

* cited by examiner

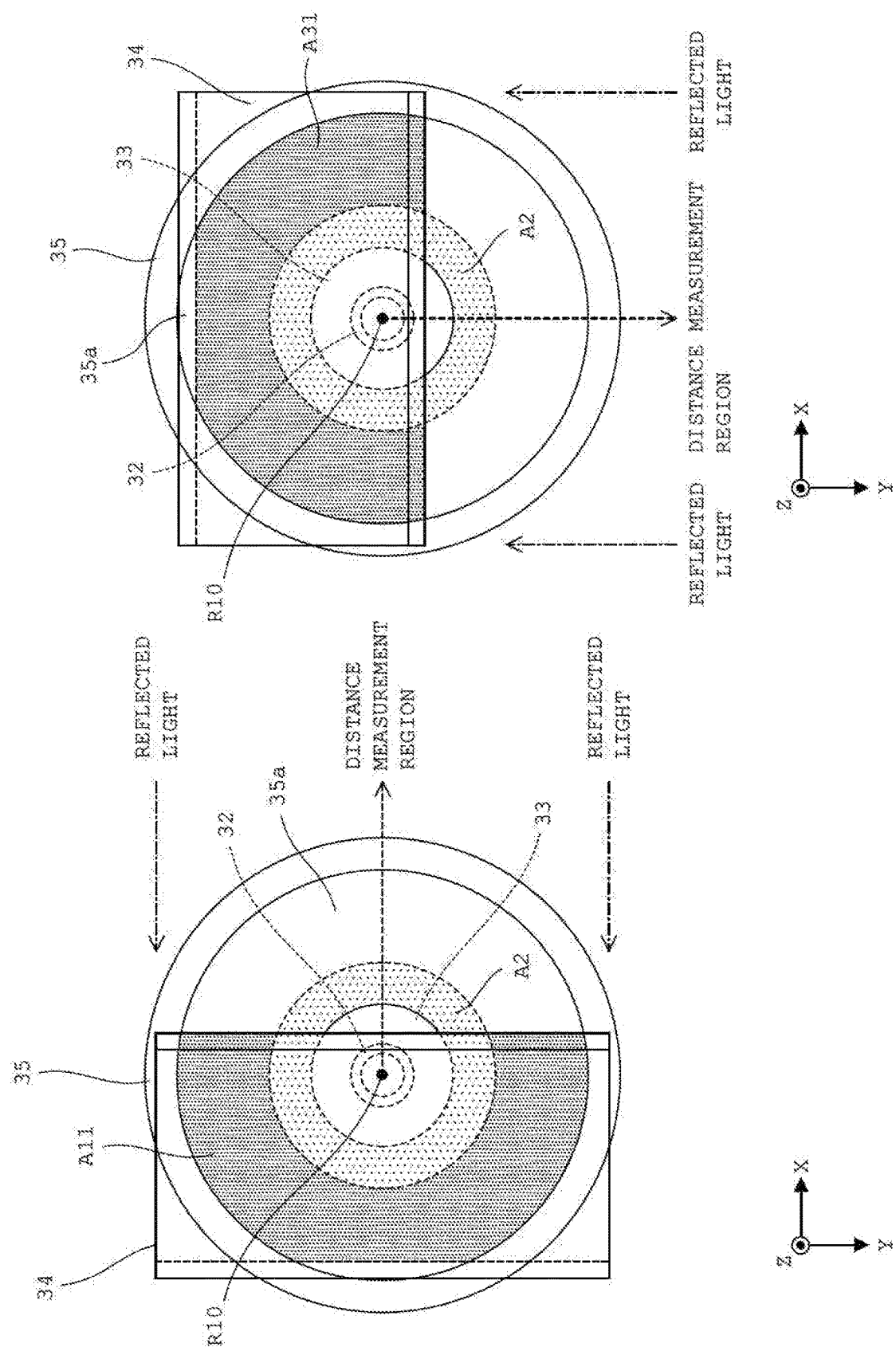

DISTANCE MEASUREMENT DEVICE

CROSS REFERENCE TO RELATED APPLICATION

This application is a continuation of International Application No. PCT/JP2019/013352 filed on Mar. 27, 2019, entitled "DISTANCE MEASUREMENT DEVICE", which claims priority under 35 U.S.C. Section 119 of Japanese Patent Application No. 2018-095690 filed on May 17, 2018, entitled "DISTANCE MEASUREMENT DEVICE". The disclosure of the above applications is incorporated herein by reference.

BACKGROUND OF THE INVENTION

1. Field of the Invention

The present invention relates to a distance measurement device that measures the distance to an object using light.

2. Disclosure of Related Art

To date, a distance measurement device that measures the distance to an object using light has been mounted on various apparatuses. As a method for measuring a distance using light, for example, a method using the triangulation method has been known. In this method, a positional difference (parallax) between a light source that projects light to an object in a target region and a detection optical system including a condensing lens and a photodetector is provided, and a distance is measured by using the fact that the position at which an image is formed on the photodetector when the projected light is reflected and returned from an object is different depending on the distance to the object. However, in this method, in order to measure the distance to a far object, it is necessary to increase the parallax on the basis of the geometrical principle, so that the size of the distance measurement device is increased. As a method that can inhibit this problem, a method of measuring the distance to an object on the basis of the time difference (time of flight) from the emission of light to the reception of reflected light, etc., can be used.

Japanese Laid-Open Patent Publication No. 2015-148605 discloses a laser scanner configured to rotate laser light using a mirror. In this laser scanner, a rotary substrate that rotates about a rotation center axis is provided, and an optical system for projection and reception of light is installed on the rotary substrate. Specifically, a light emitter is disposed such that the emission optical axis thereof coincides with the rotation center axis, and the mirror is disposed so as to be tilted at 45° relative to the rotation center axis. In addition, a condensing lens is disposed such that the optical axis thereof coincides with the rotation center axis, and a photodetector is further disposed on the rotation center axis.

The laser light emitted from the light emitter is reflected by the mirror in a direction perpendicular to the rotation center axis and projected to a target region. By rotating the rotary substrate, the target region around the distance measurement device is scanned with the laser light. The reflected light from an object in the target region is reflected by the mirror and condensed on the photodetector by the condensing lens. Whether or not an object exists in the target region is determined on the basis of the presence/absence of reflected light. In addition, the distance to an object is measured by the time-of-flight method.

In the configuration of Japanese Laid-Open Patent Publication No. 2015-148605, in order to take the reflected light from the target region into the condensing lens, a large mirror that covers the entire region of the condensing lens is tilted and disposed above the condensing lens. Therefore, a space for disposing the large mirror needs to be provided above the condensing lens, resulting in a problem that the shape of the device is increased in a direction parallel to the rotation center axis.

SUMMARY OF THE INVENTION

A main aspect of the present invention is directed to a distance measurement device for measuring a distance to an object that exists in a distance measurement region, by rotating laser light about a rotation center axis. The distance measurement device according to the aspect includes: a mirror disposed so as to be tilted relative to the rotation center axis; a drive unit configured to rotate the mirror about the rotation center axis; a photodetector configured to detect reflected light, of the laser light, reflected in the distance measurement region; and a condensing lens disposed on the rotation center axis and configured to condense the reflected light reflected by the mirror, on the photodetector. The mirror has a shape elongated in one direction and is disposed such that a short axis thereof is tilted relative to the rotation center axis in a direction parallel to a plane including the rotation center axis, and a width in a short-axis direction of the mirror is smaller than a width of a lens portion of the condensing lens as viewed in a direction parallel to the rotation center axis.

In the distance measurement device according to the aspect, the height of the mirror in the direction parallel to the rotation center axis can be decreased. Thus, the size of the distance measurement device can be reduced in the rotation center axis direction.

BRIEF DESCRIPTION OF THE DRAWINGS

The above and other objects and new features of the present invention will be fully clarified by the following description of the embodiment, when read in conjunction with accompanying drawings.

FIG. 5A and FIG. 5B are each a plan view of a mirror and a condensing lens according to a modification as viewed in a direction parallel to a rotation center axis;

It should be noted that the drawings are solely for description and do not limit the scope of the present invention by any degree.

DESCRIPTION OF THE PREFERRED EMBODIMENTS

Hereinafter, an embodiment of the present invention will be described with reference to the drawings. For convenience, in each drawing, X, Y, and Z axes that are orthogonal to each other are additionally shown. The Z-axis positive direction is the height direction of a distance measurement device 1.

Figure 1:
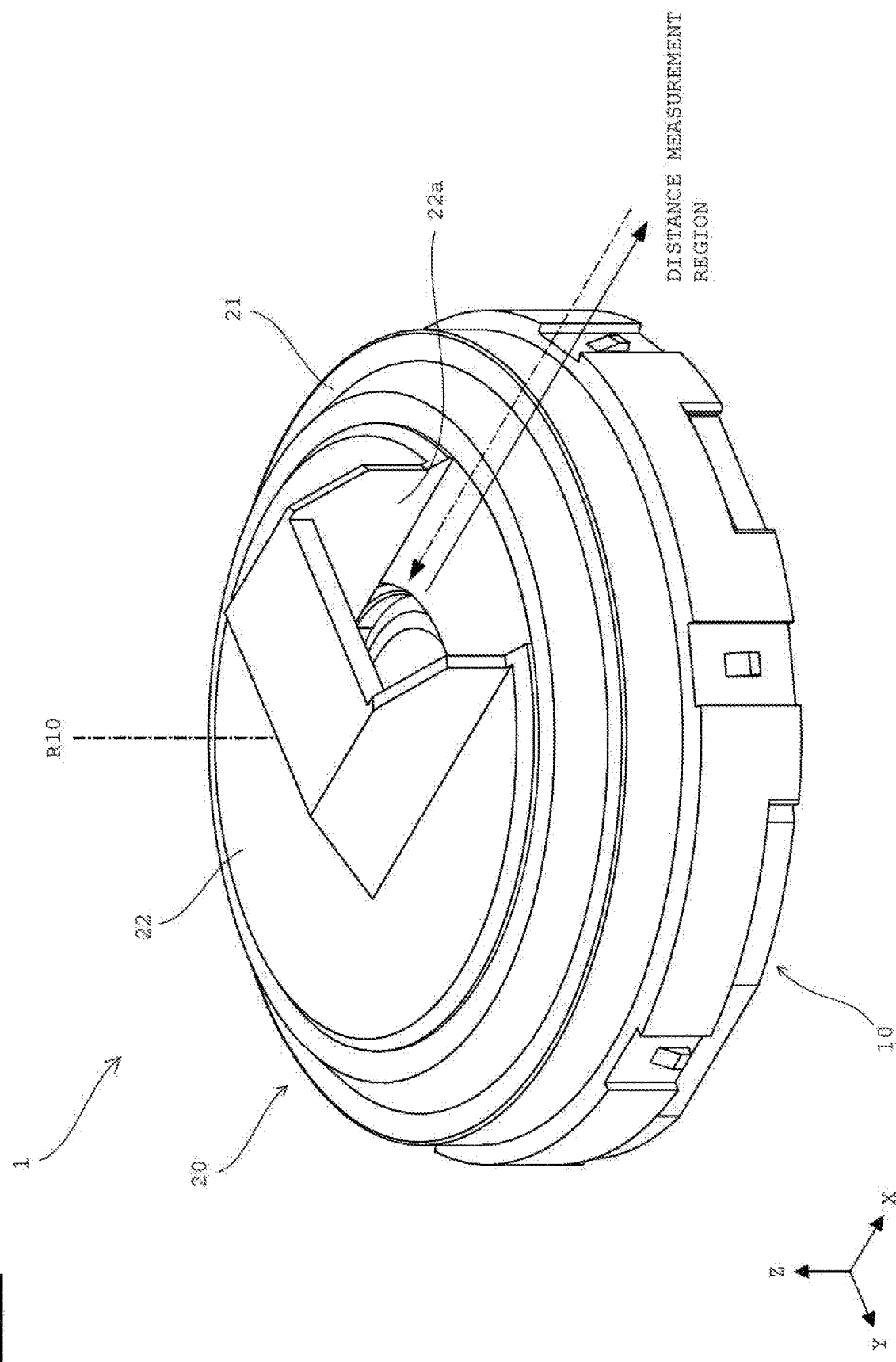
FIG. 1 is a perspective view showing a configuration of a distance measurement device according to an embodiment.

FIG. 1 is a perspective view showing a configuration of the distance measurement device 1.

As shown in FIG. 1, the distance measurement device 1 includes a cylindrical fixing part 10 and a rotary part 20 that is rotatably disposed on the fixing part 10. The rotary part 20 includes two support members 21 and 22 having diameters different from each other. The rotary part 20 is configured such that the support member 22 is installed on the upper surface of the support member 21. An opening 22a is provided in a side surface of the support member 22. Laser light (projection light) is projected from the opening 22a toward a distance measurement region, and reflected light, of the laser light, reflected in the distance measurement region is taken into the inside of the distance measurement device 1 through the opening 22a.

The rotary part 20 rotates about a rotation center axis R10 that is parallel to the Z axis and extends through the center of the rotary part 20. As the rotary part 20 rotates, the optical axis of the laser light projected from the opening 22a rotates about the rotation center axis R10. Accordingly, the distance measurement region (position scanned with the laser light) also rotates. As will be described later, the distance measurement device 1 measures the distance to an object that exists in the distance measurement region, on the basis of the time difference (time of flight) between the timing when the laser light is projected to the distance measurement region and the timing when the reflected light of the laser light from the distance measurement region is received. When the rotary part 20 makes one rotation about the rotation center axis R10 as described above, the distance measurement device 1 can measure the distances to objects that exist in a range of 360 degrees around the distance measurement device 1.

Figure 2:
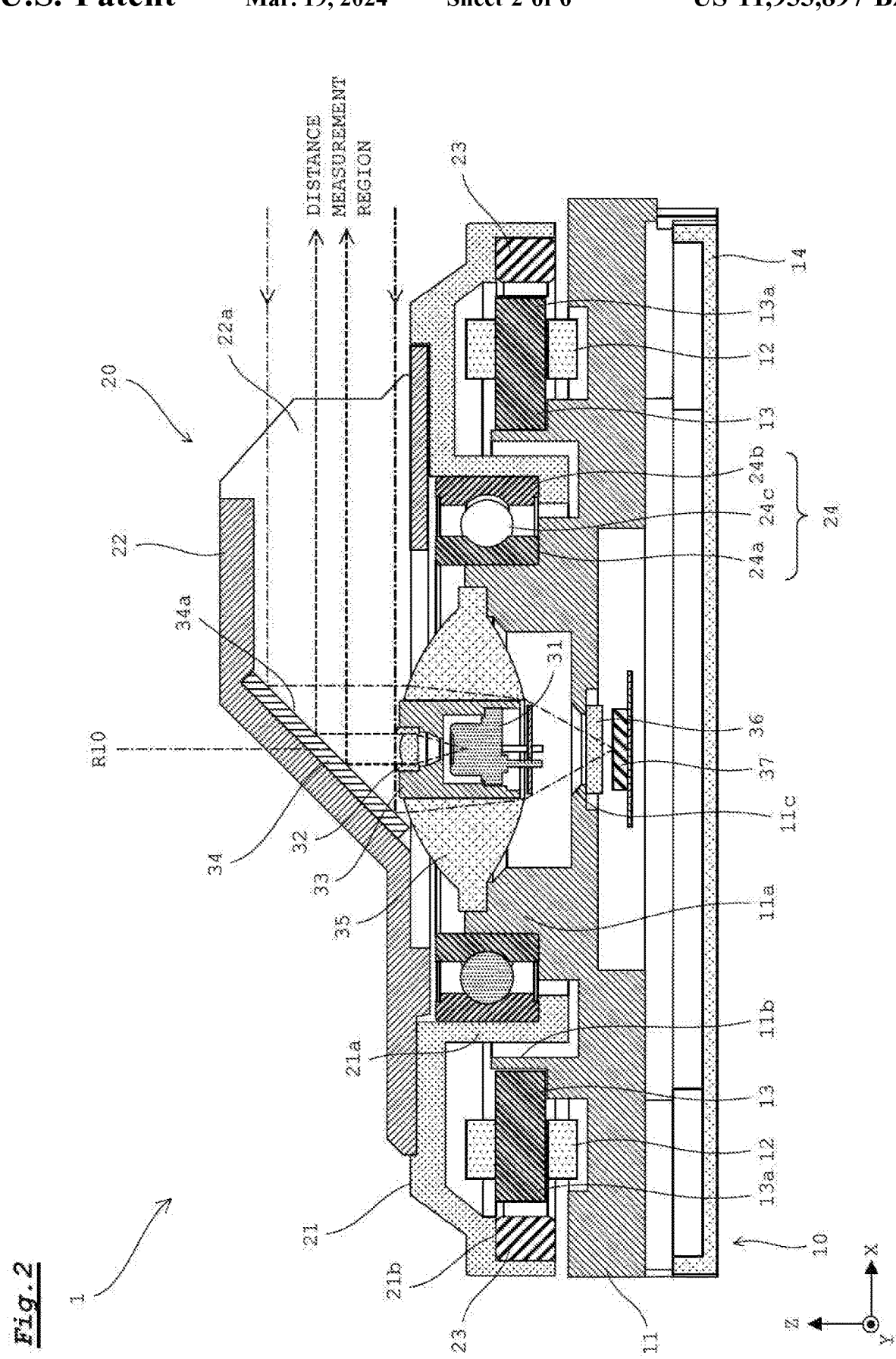
FIG. 2 is a cross-sectional view showing the configuration of the distance measurement device according to the embodiment.

FIG. 2 is a cross-sectional view showing the configuration of the distance measurement device 1.

FIG. 2 shows a cross-sectional view when the distance measurement device 1 shown in FIG. 1 is cut at the center position in the Y-axis direction along a plane parallel to the XZ plane. In FIG. 2, laser light (projection light) emitted from a light source 31 and travelling toward the distance measurement region is indicated by broken lines, and reflected light reflected from the distance measurement region is indicated by alternate long and short dash lines.

As shown in FIG. 2, the fixing part 10 includes a cylindrical support base 11, a plurality of coils 12, a yoke 13, and a cover 14. The support base 11 is formed from, for example, a resin. The lower surface of the support base 11 is covered with the cover 14 having a circular plate shape.

The support member 21 is installed on the support base via a cylindrical bearing 24. The bearing 24 has a configuration in which a plurality of bearing balls 24c are arranged between an inner cylinder 24a and an outer cylinder 24b so as to be aligned in the circumferential direction. A cylindrical tube portion 21a that projects in the Z-axis negative direction is formed in the support member 21, and a cylindrical tube portion 11a that projects in the Z-axis positive direction is formed in the support base 11. The outer diameter of the tube portion 11a is slightly larger than the inner diameter of the inner cylinder 24a of the bearing 24, and the inner diameter of the tube portion 21a is slightly smaller than the outer diameter of the outer cylinder 24b of the bearing 24. The bearing 24 is fitted between the tube portion 11a and the tube portion 21a, and the support member 21 is supported by the support base 11 so as to be rotatable about the rotation center axis R10.

In the support base 11, a cylindrical wall portion 11b is formed on the outer side of the tube portion 11a. The central axis of the wall portion 11b is aligned with the rotation center axis R10. The yoke 13 is fitted on the outer periphery of the wall portion 11b. The yoke 13 includes a plurality of projection portions 13a that radially protrude from a ring-shaped base portion. The intervals between the projection portions 13a in the circumference direction are constant. The coils 12 are wound and mounted on the projection portions 13a, respectively.

A step portion 21b is formed on an outer peripheral portion of the support member 21 so as to be continuous in the circumferential direction. A plurality of magnets 23 are installed on the step portion 21b without any gap in the circumferential direction. The adjacent magnets 23 have different polarities on the inner side. These magnets 23 face the projection portions 13a of the yoke 13. Therefore, by controlling a current to the coils 12, the rotary part 20 is rotationally driven about the rotation center axis R10. The coils 12, the yoke 13, and the bearing 24 form a drive unit that rotates a mirror 34 together with the rotary part 20 about the rotation center axis R10.

The distance measurement device 1 includes the light source 31, a collimator lens 32, a holder 33, the mirror 34, a condensing lens 35, a filter 36, and a photodetector 37 as components of an optical system. The light source 31 is held by the holder 33 together with the collimator lens 32.

The light source 31 emits laser light having a predetermined wavelength. The light source 31 is, for example, a semiconductor laser. The emission optical axis of the light source 31 is parallel to the Z axis. The laser light emitted from the light source 31 is converted into parallel light by the collimator lens 32. The laser light converted into parallel light is incident on the mirror 34 disposed above the condensing lens 35. The light source 31 and the collimator lens 32 are installed in the condensing lens 35 in a state where the light source 31 and the collimator lens 32 are held by the holder 33. A circular opening is formed at the center of the condensing lens 35 so as to vertically penetrate the condensing lens 35, and the holder 33 having a columnar shape is fitted and installed in the opening.

The mirror 34 is a reflecting mirror having a reflecting surface 34a on one surface thereof. The center position of the reflecting surface 34a is substantially aligned with the rotation center axis R10. The reflecting surface 34a has a rectangular shape elongated in the Y-axis direction. The mirror 34 is installed on the support member 22 of the rotary part 20 such that the long axis thereof, that is, the axis parallel to the long direction thereof, is parallel to the Y axis, and the short axis thereof, that is, the axis parallel to the short direction thereof, is tilted at 45° relative to the rotation center axis R10 in a direction parallel to the plane including the rotation center axis R10 (direction parallel to the XZ plane).

The laser light that is incident on the mirror 34 via the collimator lens 32 is reflected by the mirror 34 in a direction perpendicular to the rotation center axis R10. Thereafter, the laser light is projected through the opening 22a to the distance measurement region.

When an object exists in the distance measurement region, the laser light projected from the opening 22a to the distance measurement region is reflected by the object and travels toward the opening 22a again. The reflected light reflected from the object as described above is taken in through the opening 22a and guided to the mirror 34. Thereafter, the reflected light is reflected by the mirror 34 in the Z-axis negative direction. The reflected light reflected by the mirror undergoes a convergence action by the condensing lens 35. Thereafter, the reflected light is incident on the filter 36 via a hole 11c formed in the support base 11. Accordingly, the reflected light is converged on the photodetector 37 via the filter 36. The filter 36 is configured to transmit light in the wavelength band of the laser light emitted from the light source and block light in the other wavelength bands. The photodetector 37 outputs a detection signal corresponding to the amount of received light. The detection signal from the photodetector 37 is outputted to a circuitry disposed on a circuit board that is not shown.

In the present embodiment, due to the configuration in which the light source 31 and the collimator lens 32 are installed in the condensing lens 35, a part of the reflected light taken in through the opening 22a is blocked by the holder 33 and is not condensed onto the photodetector 37. For example, most of the reflected light indicated by the alternate long and short dash lines in FIG. 2 is blocked by the holder 33.

Figure 3A:
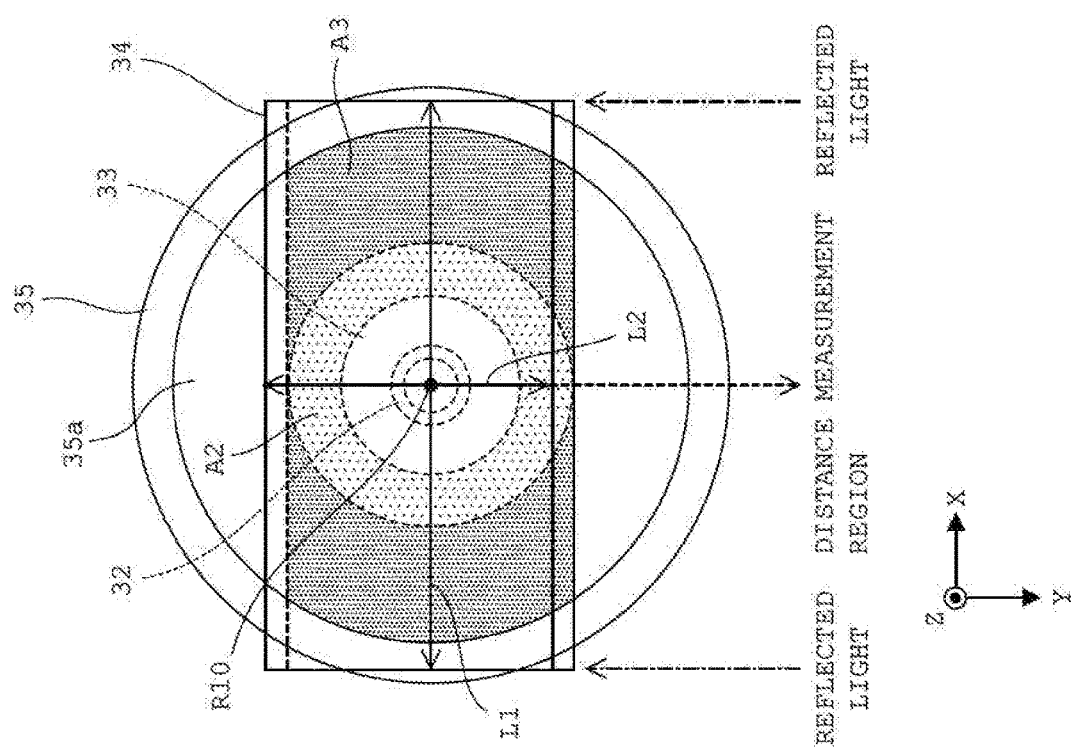
FIG. 3A and FIG. 3B are each a plan view of a mirror and a condensing lens according to the embodiment as viewed in a direction parallel to a rotation center axis.
Figure 3B:
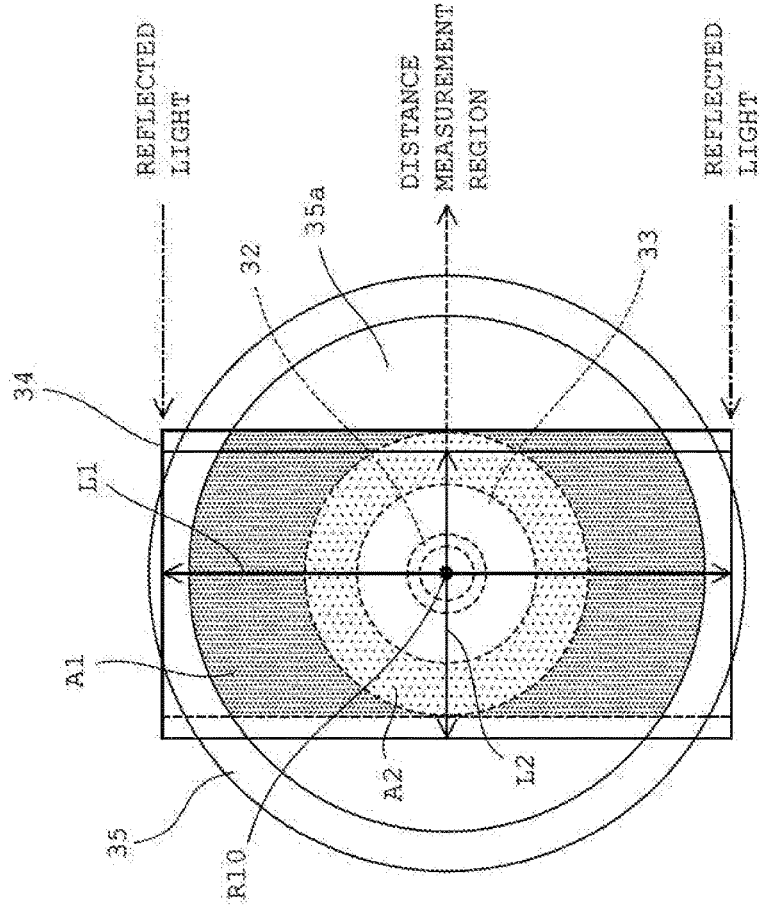

FIG. 3A and FIG. 3B are each a plan view of the mirror 34 and the condensing lens 35 as viewed in a direction parallel to the rotation center axis R10. FIG. 3A shows a state when the projection direction of the laser light is the X-axis positive direction, and FIG. 3B shows a state where the projection direction of the laser light is the Y-axis positive direction. For convenience, in FIG. 3A and FIG. 3B, the condensing lens 35 is shown as seen through the mirror 34.

In FIG. 3A and FIG. 3B, reference characters L1 and L2 denote the long axis and the short axis of the mirror 34, respectively. As described above, the mirror 34 is disposed such that the short axis L2 thereof is tilted at 45° relative to the rotation center axis R10 in the direction parallel to the XZ plane. The long axis L1 of the mirror 34 is perpendicular to the rotation center axis R10. The mirror 34 is disposed such that the center of the reflecting surface 34a is aligned with the rotation center axis R10.

As shown in FIG. 3A and FIG. 3B, as viewed in the direction parallel to the rotation center axis R10, the width in the long-axis direction of the mirror 34 is larger than the width (diameter) of a lens portion 35a of the condensing lens 35, and the width in the short-axis direction of the mirror 34 is smaller than the width (diameter) of the lens portion 35a of the lens portion 35a. Here, the lens portion 35a is a region having a lens function of condensing incident light on the photodetector 37.

Since the width in the short-axis direction of the mirror 34 is smaller than the width of the lens portion 35a of the condensing lens 35 as described above, the condensing lens 35 has regions where the mirror 34 does not overlap, in the short-axis direction of the mirror 34. Therefore, the condensing lens 35 takes in the reflected light in a region where the mirror 34 overlaps, not in the entire region of the lens portion 35a.

In the present embodiment, since the holder 33 is disposed at the center of the condensing lens 35, the region where the holder 33 is disposed does not contribute to intake of the reflected light. In addition, in a region A2 around the holder 33, as shown in FIG. 2, the reflected light is converged on the incident surface, and the reflected light reaches the side surface of the holder 33 within the condensing lens 35. Thus, the reflected light that is incident on the region A2 is not condensed onto the photodetector 37.

Therefore, the reflected light that is incident on a region other than the region A2 and the region where the holder 33 is disposed, of the region of the lens portion 35a where the mirror 34 overlaps, is converged on the photodetector 37. That is, in the state of FIG. 3A, the reflected light that is incident on a region A1 is condensed on the photodetector 37, and, in the state of FIG. 3B, the reflected light that is incident on a region A3 is condensed on the photodetector 37. The area of the region A1 is equal to that of the region A3. As the mirror 34 rotates, the region on the lens portion 35a that allows the reflected light to be condensed on the photodetector is changed. However, the area of this region is constant regardless of the rotation of the mirror 34.

As described above, according to the configuration of the present embodiment, regardless of the rotation position of the mirror 34, in a region outside the region A2 of the lens portion 35a, the reflected light from the distance measurement region can be condensed on the photodetector 37. Thus, the distance measurement device 1 can appropriately detect the reflected light from the distance measurement region.

Figure 4:
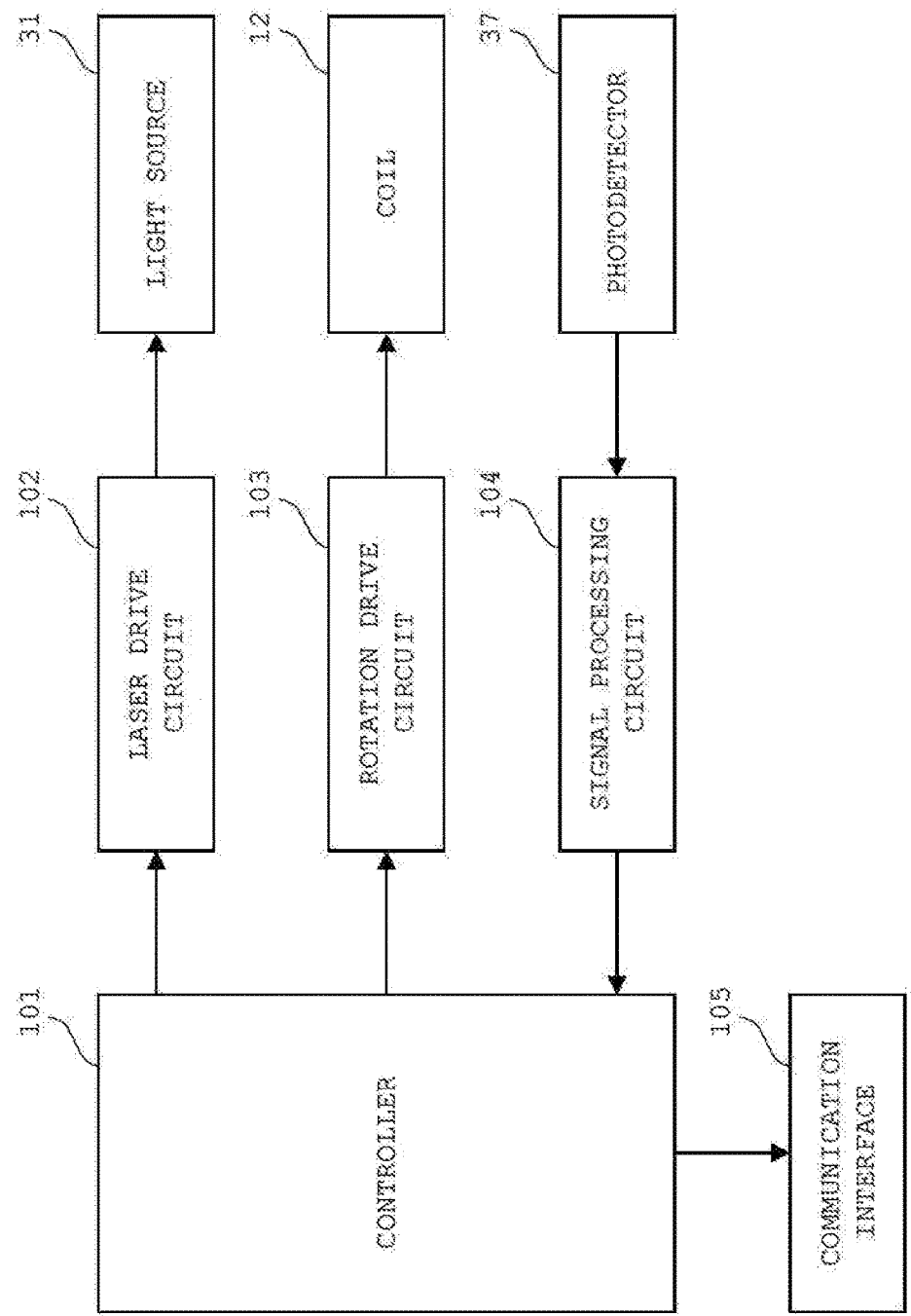
FIG. 4 is a diagram showing a configuration of a circuitry of the distance measurement device according to the embodiment.

FIG. 4 is a diagram showing a configuration of the circuitry of the distance measurement device 1.

As shown in FIG. 4, the distance measurement device 1 includes a controller 101, a laser drive circuit 102, a rotation drive circuit 103, and a signal processing circuit 104 as components of the circuitry.

The controller 101 includes an arithmetic processing circuit such as a CPU (central processing unit), and a memory, and controls each part according to a predetermined control program. The laser drive circuit 102 drives the light source 31 in accordance with the control from the controller 101. The rotation drive circuit 103 causes a current to flow through the coils 12 in accordance with the control from the controller 101. For example, the controller 101 controls the rotation drive circuit 103 such that the rotary part 20 rotates at a predetermined rotation speed. Accordingly, the magnitude and the timing of the current to be caused to flow from the rotation drive circuit 103 through the coils 12 are adjusted.

The signal processing circuit 104 performs amplification and noise removal processing on the detection signal inputted from the photodetector 37, and outputs the resultant signal to the controller 101. A communication interface 105 is an interface for performing communication with an apparatus in which the distance measurement device 1 is installed.

In a distance measurement operation, while controlling the rotation drive circuit 103 to rotate the mirror 34 together with the rotary part 20, the controller 101 controls the laser drive circuit 102 to output laser light of a predetermined pulse from the light source 31 at each predetermined timing. The controller 101 detects the timing when the laser light pulse emitted at each emission timing is received, on the basis of the detection signal of the photodetector 37 inputted from the signal processing circuit 104. Then, the controller 101 measures the distance to an object that exists in the distance measurement region at each emission timing, on the basis of the time difference (time of flight) between the timing when the laser light is emitted and the timing when the laser light is received.

The controller 101 transmits data of the distance calculated thus, via the communication interface 105 to the apparatus in which the distance measurement device 1 is installed, as needed. On the apparatus side, the distance to the object that exists in a range of 360 degrees therearound is acquired on the basis of the received distance data, and predetermined control is executed.

Effects of Embodiment

According to the embodiment described above, the following effects are achieved.

The mirror 34 has a rectangular shape elongated in one direction, and is disposed such that the short axis L2 thereof is tilted relative to the rotation center axis R10 in the direction parallel to the plane including the rotation center axis R10 (direction parallel to the XZ plane in FIG. 2), and the width in the short-axis direction of the mirror 34 is smaller than the width of the lens portion 35a of the condensing lens 35 as viewed in the direction parallel to the rotation center axis R10. Accordingly, the height of the mirror 34 in the direction parallel to the rotation center axis R10 can be decreased, and thus the size of the distance measurement device 1 can be reduced in the direction parallel to the rotation center axis R10.

As shown in FIG. 3A and FIG. 3B, the width in the long-axis direction of the mirror 34 is larger than the width of the lens portion 35a of the condensing lens 35 as viewed in the direction parallel to the rotation center axis R10. Accordingly, in the long-axis direction of the mirror 34, the reflected light from the distance measurement region can be taken into the condensing lens 35 as sufficiently as possible. Thus, the reflected light from the distance measurement region can be more appropriately detected.

Even when the width in the long-axis direction of the mirror 34 is equal to the width of the lens portion 35a of the condensing lens 35, the same advantageous effect as described above can be achieved. That is, in order to take the reflected light from the distance measurement region into the condensing lens 35 as sufficiently as possible in the long-axis direction of the mirror 34, the width in the long-axis direction of the mirror 34 may be set so as to be equal to or larger than the width of the lens portion 35a of the condensing lens 35.

As shown in FIG. 2, FIG. 3A, and FIG. 3B, in the above embodiment, the mirror 34 is disposed such that the center of the reflecting surface 34a of the mirror 34 substantially coincides with the rotation center axis R10. Accordingly, the region of the lens portion 35a where the mirror 34 overlaps can be made the widest, and the reflected light from the distance measurement region can be more effectively guided to the photodetector 37. Thus, the distance measurement device 1 can more appropriately detect the reflected light from the distance measurement region.

As shown in FIG. 2, the distance measurement device 1 includes the fixing part 10 and the rotary part 20 supported so as to be rotatable about the rotation center axis R10 relative to the fixing part 10, the mirror 34 is installed in the rotary part 20, the condensing lens 35 is installed in the fixing part 10, and the distance measurement device 1 is configured such that the mirror 34 rotates by the drive unit (the coils 12, the magnets 23, etc.) rotating the rotary part 20. Since only the mirror 34, of the mirror 34 and the condensing lens 35, is disposed in the rotary part 20 as described above, the weight of the rotary part 20 can be reduced. Thus, the mirror 34 can be more smoothly rotated together with the rotary part 20.

As shown in FIG. 2, the light source 31 and the photodetector 37 are installed in the fixing part 10. Since the light source 31 and the photodetector 37 are installed on the fixing part 10 side as described above, electrical connection between the light source 31 and the photodetector 37, and the circuitry, can be easily and smoothly made.

As shown in FIG. 2, the light source 31 is embedded in the condensing lens 35 and installed in the fixing part 10. According to this configuration, for example, a space for disposing the light source 31 and an optical system for separating the laser light from the light source 31 and the reflected light from the distance measurement region is unnecessary below the condensing lens 35. Thus, the size of the distance measurement device 1 can be more effectively reduced in the direction parallel to the rotation center axis R10.

Modifications

The configuration of the distance measurement device 1 can be modified in various ways other than the configuration shown in the above embodiment.

For example, in the above embodiment, the mirror 34 is disposed such that the center of the reflecting surface 34a is aligned with the rotation center axis R10. However, the mirror may be disposed such that the center of the reflecting surface 34a is displaced from the rotation center axis R10.

FIG. 5A and FIG. 5B are each a diagram showing a configuration example in the case where the mirror 34 is disposed such that the center of the reflecting surface 34a is displaced from the rotation center axis R10 in the direction opposite to the projection direction. Similar to FIG. 3A and FIG. 3B, FIG. 5A and FIG. 5B are each a plan view of the mirror and the condensing lens 35 as viewed in the direction parallel to the rotation center axis R10. In this configuration example, the mirror 34 is disposed at a position shifted in the X-axis negative direction from the state of FIG. 2. Accordingly, the shape of the support member 22 is changed.

In this configuration example, regions A11 and A31 of the lens portion 35a of the condensing lens 35 are used for intake of the reflected light. Similar to the above embodiment, the area of a region of the lens portion 35a that is used for intake of the reflected light is constant regardless of rotation of the mirror 34. It should be noted that, in this configuration example, the areas of the regions A11 and A31 are slightly decreased as compared to those of the regions A1 and A3 in the case of FIG. 3A and FIG. 3B. Thus, in order to guide more reflected light to the photodetector 37, it is preferable to dispose the mirror 34 such that the center of the reflecting surface 34a and the rotation center axis R10 are aligned with each other as in the above embodiment.

In the above embodiment, the light source 31 and the collimator lens 32 are installed in the condensing lens 35. However, the light source 31 and the collimator lens 32 may be disposed at a position separate from the condensing lens 35.

Figure 6B:
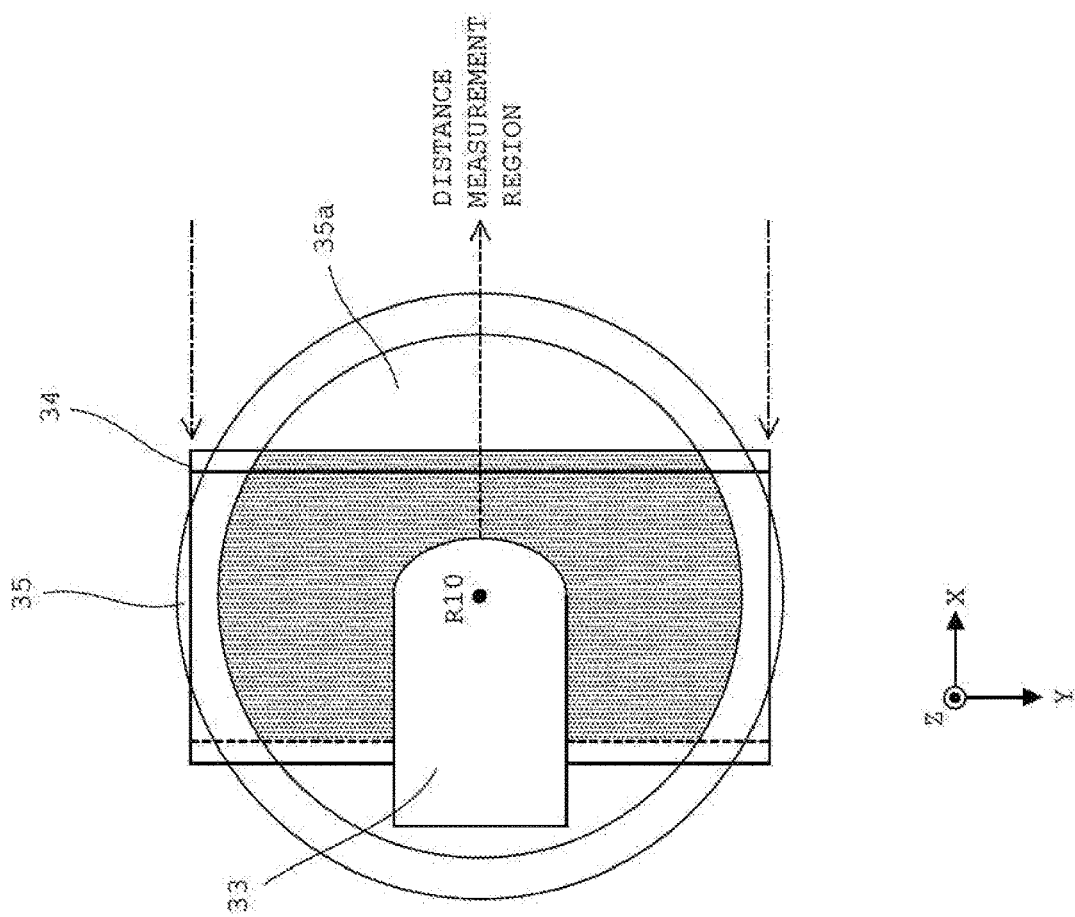
FIG. 6B is a plan view of a mirror and a condensing lens according to the other modification as viewed in a direction parallel to a rotation center axis.
Figure 6A:
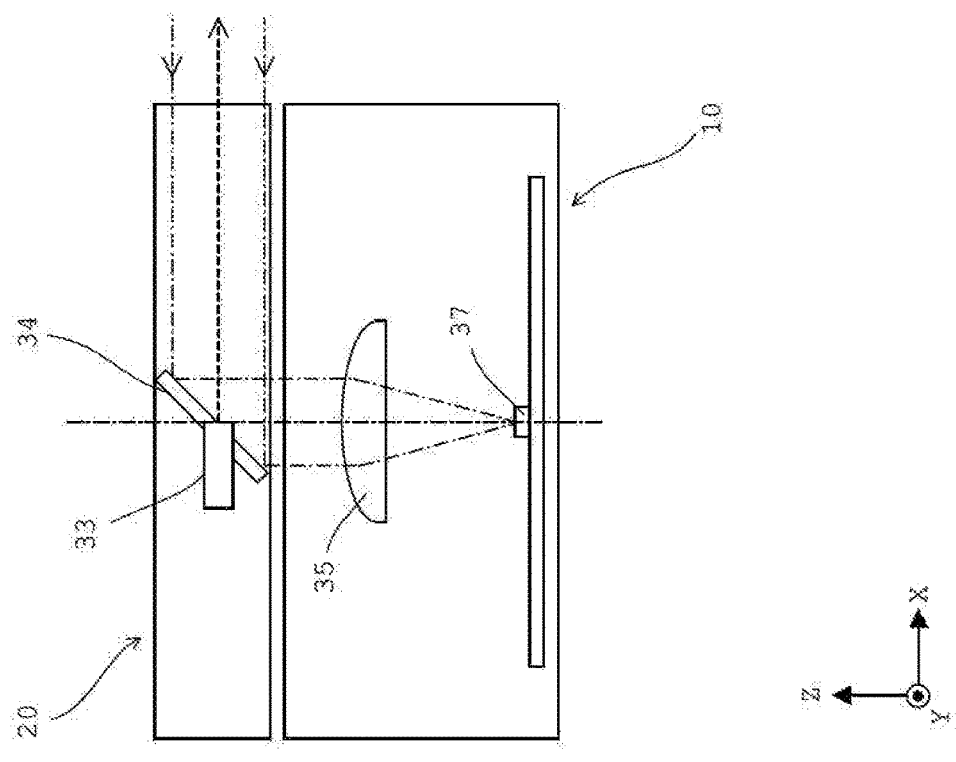
FIG. 6A is a side perspective view schematically showing a configuration of a distance measurement device according to another modification.

FIG. 6A and FIG. 6B are each a diagram showing a configuration in the case where the light source 31 and the collimator lens 32 are disposed in the rotary part 20. FIG. 6A is a side perspective view schematically showing a configuration of the distance measurement device 1 according to this modification, and FIG. 6B is a plan view of the holder 33, the mirror 34, and the condensing lens 35 according to this medication as viewed in the direction parallel to the rotation center axis R10.

In this modification, a hole is provided at the center of the mirror 34 so as to penetrate the mirror 34 in the X-axis direction, and the holder 33 is fitted into this hole. Similar to the above embodiment, the light source 31 and the collimator lens 32 are held in the holder 33. In FIG. 6A and FIG. 6B, the laser light is emitted from the light source 31 in the X-axis positive direction.

In this modification, the entire region of the lens portion 35a of the condensing lens 35 can be used for intake of the reflected light. It should be noted that, since the hole for fitting the holder 33 thereinto is provided in the mirror 34, the reflected light that is incident on the region of this hole is not reflected to the condensing lens 35. Thus, the reflected light that is incident on the reflecting surface 34a excluding the hole is condensed on the photodetector 37 by the condensing lens 35.

In this modification, since the light source 31 is disposed in the rotary part 20, a configuration for supplying power from the fixing part 10 side to the rotary part 20 side is needed. Thus, it can be said that, in order to stably drive the light source 31 with a simple configuration, it is preferable to dispose the light source 31 on the fixing part 10 side as in the above embodiment.

In the above embodiment, the mirror 34 has a rectangular shape in a plan view. However, the mirror 34 may have another shape as long as the shape is long in one direction. For example, the mirror 34 may have a shape obtained by rounding the corners of a rectangle, in a plan view.

In the above embodiment, the long axis L1 of the mirror 34 is larger than the width of the lens portion 35a. However, the long axis L1 of the mirror 34 may be smaller than the width of the lens portion 35a. It should be noted that, in this case, since the region of the lens portion 35a where the mirror 34 overlaps is reduced as compared to that in the above embodiment, the amount of the reflected light guided to the photodetector 37 is decreased. Thus, in order to ensure a larger amount of the reflected light guided to the photodetector 37, it is preferable that the long axis L1 of the mirror 34 is equal to or larger than the width of the lens portion 35a.

In the above embodiment, the coils 12 and the magnets 23 are disposed in the fixing part 10 and the rotary part 20, respectively, and the rotary part 20 is driven. However, the rotary part 20 may be driven by another drive mechanism. For example, a gear may be provided on the outer peripheral surface of the rotary part 20 over the entire circumference, and a drive mechanism may be configured such that a gear installed on a drive shaft of a motor meshes with this gear.

The configuration for rotatably supporting the rotary part 20 is not limited to the configuration of the above embodiment. In addition, the projection direction of the laser light (projection light) does not necessarily have to be the direction perpendicular to the rotation center axis R10, and may be tilted at a predetermined angle relative to the direction perpendicular to the rotation center axis R10. The number of coils 12 disposed and the number of magnets 23 disposed can also be changed as appropriate.

The structure according to the present invention can also be applied to a device that does not have a distance measurement function and has only a function of detecting whether or not an object exists in the projection direction, on the basis of a signal from the photodetector 37. In this case as well, the shape of the device can be reduced in a direction parallel to a rotation center axis.

In addition to the above, various modifications can be made as appropriate to the embodiments of the present invention, without departing from the scope of the technological idea defined by the claims.

What is claimed is:

1. A distance measurement device for measuring a distance to an object that exists in a distance measurement region, by rotating laser light about a rotation center axis, the distance measurement device comprising:
    a mirror disposed so as to be tilted relative to the rotation center axis;
    a drive unit configured to rotate the mirror about the rotation center axis;
    a photodetector configured to detect reflected light, of the laser light, reflected in the distance measurement region; and
    a condensing lens disposed on the rotation center axis and configured to condense the reflected light reflected by the mirror, on the photodetector, wherein
    the mirror has a shape elongated in one direction and is disposed such that a short axis thereof is tilted relative to the rotation center axis in a direction parallel to a plane including the rotation center axis, and
    a width in a short-axis direction of the mirror is smaller than a width of a lens portion of the condensing lens as viewed in a direction parallel to the rotation center axis.

2. The distance measurement device according to claim 1, wherein a width in a long-axis direction of the mirror is equal to or larger than the width of the lens portion of the condensing lens as viewed in the direction parallel to the rotation center axis.

3. The distance measurement device according to claim 1, wherein the mirror is disposed such that a center of a reflecting surface of the mirror substantially coincides with the rotation center axis.

4. The distance measurement device according to claim 1, further comprising:
    a fixing part; and
    a rotary part supported so as to be rotatable about the rotation center axis relative to the fixing part, wherein
    the mirror is installed in the rotary part,
    the condensing lens is installed in the fixing part, and
    the drive unit rotates the mirror by rotating the rotary part.

5. The distance measurement device according to claim 4, wherein the photodetector and a light source configured to emit the laser light are installed in the fixing part.

6. The distance measurement device according to claim 5, wherein the light source is installed so as to be embedded in the condensing lens.

* * * * *